June 21, 1955 R. J. ROCKWELL 2,711,512
MODULATION SYSTEM
Filed Aug. 11, 1954
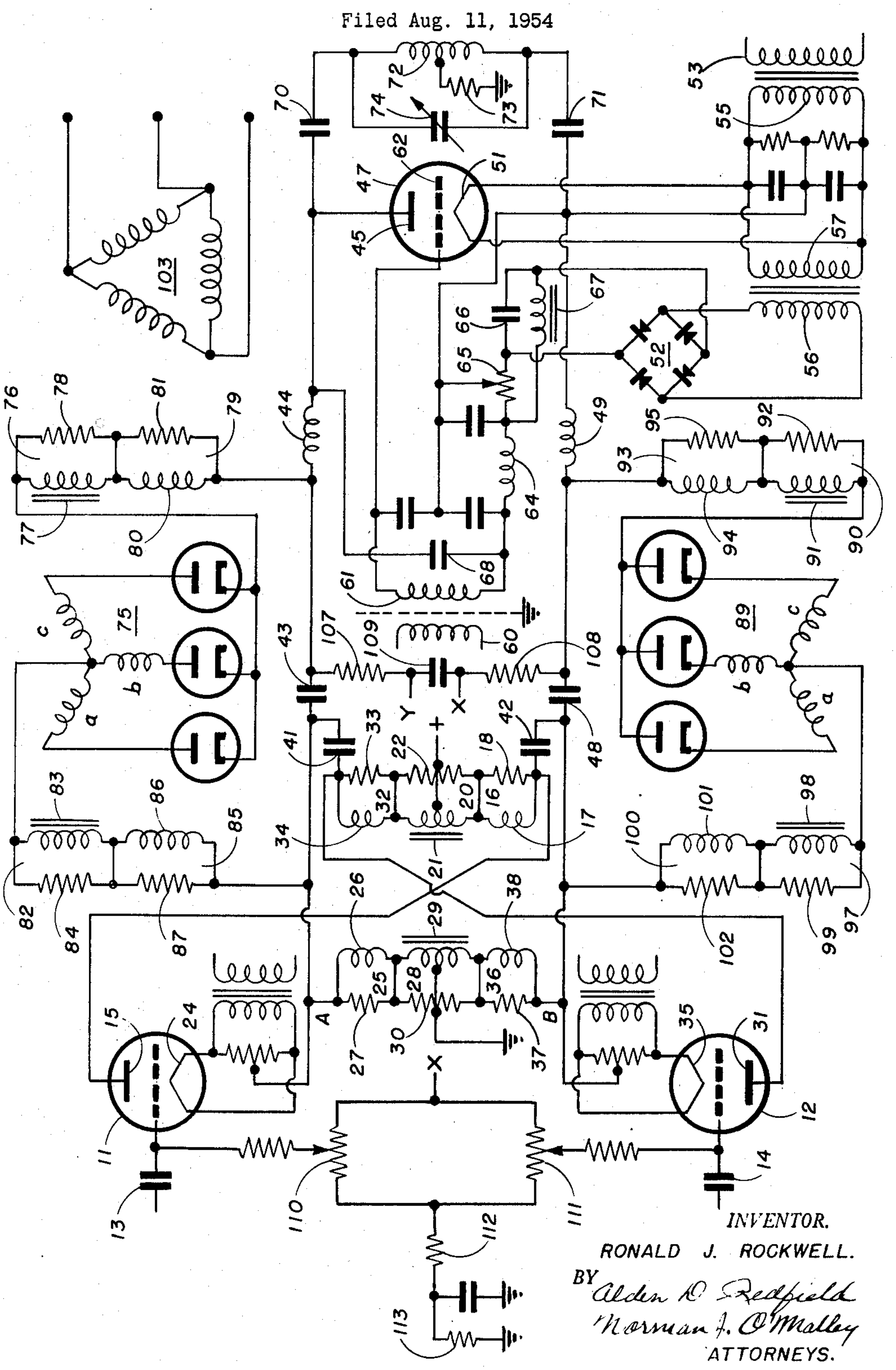
INVENTOR.
RONALD J. ROCKWELL.
BY Alden D. Redfield
Norman J. O'Malley
ATTORNEYS.

United States Patent Office 2,711,512

Patented June 21, 1955

2,711,512

MODULATION SYSTEM

Ronald J. Rockwell, Cincinnati, Ohio, assignor to Crosley Broadcasting Corporation, Cincinnati, Ohio, a corporation of Ohio Application August 11, 1954, Serial No. 449,073

2 Claims. (Cl. 332—43)

This invention relates to ratio frequency transmitters and, more specifically, to modulation circuits for use in a radio frequency transmitter.

High level modulation or plate modulation circuits, i. e., circuits where the high level radio frequency stage is modulated through its anode or plate voltage, usually include a modulation transformer between the audio frequency modulator and the modulated high level radio frequency stage. In such circuits, in order to keep the direct current supply of the radio frequency stage from saturating the modulation transformer core, it usually has been considered necessary to capacitively couple the output or secondary of the modulation transformer to a modulation reactance placed in the direct current plate supply circuit of the radio frequency stage. Inherently, the modulation transformer is in series relationship with any overall feedback path and, in prior art circuits, this makes it extremely difficult to compensate for distortion arising from limitations of the transformer.

As a result, circuits of this type cannot be relied upon to pass true high fidelity signals. In addition, prior art circuits which utilize a common direct current power source for the audio modulator and the high level radio frequency modulated stage have an inherent design problem arising from the fluctuations in the power drain of the modulator stage which, when reflected into the plate supply voltage of the radio frequency modulated stage, cause undesirable carrier shift, i. e., a shift in the carrier power output.

It would be desirable to supply a modulating system of the high level modulation type which eliminates the conventional modulation transformer, minimizes carrier shift, and transmits a very high fidelity signal.

Thus, it becomes an object of my invention to provide a high level modulation system, primarily using capacitive coupling between the modulator and the modulated stage.

It is a further object of this invention to provide a modulation system using a separate source of R. F. amplifier supply voltage to minimize carrier shift.

It is also an object of my invention to provide a transformerless modulator circuit which is coupled to modulate both the anode and the cathode circuits of a high level radio frequency modulated stage.

Briefly, my invention comprises a modulator system having a high level modulated stage capacitively coupled for anode and cathode modulation to the output of the modulator stage. My system eliminates the need for a modulator output transformer, making it possible to utilize audio and radio frequency chokes in simple circuitry so as to obtain a true high fidelity modulated signal.

In the single figure disclosing the preferred embodiment of my invention, I show a two-tube modulator amplifier stage including tubes 11 and 12. The anode 15 of modulator tube 11 is coupled to an anode potential supply source, not shown, through an air core filter choke 16, comprising coil 17 and damping resistor 18, and one-half of an iron core inductor 20, comprising coil 21 and damping resistor 22. The cathode 24 of modulator tube 11 is coupled through an air core filter choke 25, comprising coil 26 and damping resistor 27 and on to ground through one-half of an iron core inductor 28, comprising coil 29 and resistor 30. The anode 31 of modulator tube 12 is connected to a source of anode potential, not shown, in symmetrical fashion through a filter choke 32, comprising resistor 33 and coil 34 and one-half of inductor 20. Symmetrically, cathode 35 is connected to ground through one-half of inductor 28 and an open air filter choke 36, comprising resistor 37 and coil 38.

Anode 31 of modulator tube 12 is coupled to cathode 24 of modulator tube 11 through capacitor 41. In symmetrical fashion, anode 15 of modulator tube 11 is coupled to cathode 35 of modulator tube 12 through capacitor 42. The output of the modulator is taken from across the series-connected cathode inductances of the two tubes 11 and 12, i. e., coils 26, 29 and 38. The cathode 24 side of the output inductance is coupled through capacitor 43 and radio frequency filter choke 44 to anode 45 of the radio frequency amplifier tube 47. The cathode 35 side of the modulator output inductance is coupled through capacitor 48 and radio frequency filter choke 49 to cathode 51 of the radio frequency amplifier 47.

Bias voltage is supplied to the grid cathode circuit of radio frequency amplifier 47 through a copper oxide full wave rectifier circuit 52. Transformer 56, having a primary 57 which is tapped across the secondary 55 of filament transformer 53, supplies alternating current directly to rectifier circuit 52.

Radio frequency carrier signals are taken from a source, not shown, and fed through coupling transformer primary 60 to shielded secondary 61 which has one terminal coupled directly to grid 62 of amplifier 47 and its other terminal coupled to cathode 51 through radio frequency choke 64 and potentiometer 65. Capacitor 66 and coil 67 act to filter the output of rectifier 52 and reduce or minimize any alternating current ripple which otherwise would be present. Capacitor 68 is coupled between the anode 45 of radio frequency amplifier 47 and the lower side of transformer secondary 61 to act as a neutralizing signal feedback path, compensating for inherent plate-to-grid capacitive coupling in the amplifier. Additional bias, during operation, is supplied by grid rectification of the radio frequency signal fed to grid 62.

The modulated output of radio frequency amplifier 47 is taken from across the anode-cathode path of the amplifier through coupling capacitors 70 and 71 to a load circuit which may comprise a tuned transformer primary, including tuning capacitor 74 and coil 72 which is center-tapped to ground through a resistor 73.

Direct current plate-cathode voltage for the radio frequency amplifier is supplied by two separate three-phase rectifier circuits 75 and 89, each being directly coupled across one of the capacitors coupling the modulator to the radio frequency amplifier. Rectifier 75 comprises a three-phase star-connected secondary having a separate diode in each of the three secondary windings. The positive terminal of rectifier 75 is coupled through iron core choke 76, which comprises a coil 77 and damping resistor 78, and an air core filter choke 79 comprising coil 80 and resistor 81 to the radio frequency amplifier anode side of capacitor 43. The negative terminal of rectifier 75 is connected to the modulator output side of capacitor 43 through iron core choke 82, comprising a coil 83 and damping resistor 84, and filter choke 85, comprising coil 86 and damping resistor 87.

Three-phase rectifier 89 is coupled across capacitor 48 in symmetrical fashion. The negative polarity terminal of rectifier 89 is coupled to the radio frequency amplifier 47 cathode side of capacitor 48 through iron core filter choke 90, comprising coil 91 and damping resistor 92 and filter choke 93, comprising a coil 94 and damping resistor 95. The positive polarity terminal of rectifier 89 is coupled to the cathode 35 side of capacitor 48 through an iron core choke 97, comprising a coil 98 and damping resistor 99, and filter choke 100 comprising a coil 101 and damping resistor 102. The three-phase transformer secondary windings supplying rectifiers 75 and 89 are wound on common cores and are magnetically coupled to a common transformer primary, such as delta-connected primary 103, shown schematically.

Resistors 107 and 108, when connected in series with a capacitor, such as capacitor 109, and in shunt across the modulator output, form a highly satisfactory source of bias potential. Modulator tubes 11 and 12 may be biased by a negative potential taken from the junction of resistor 108 and capacitor 109. This negative potential is coupled through a pair of parallel-connected potentiometers 110 and 111 and to ground through series resistors 112 and 113. Potentiometers 110 and 111 act as controllable bias sources for the grids of capacitor tubes 11 and 12, respectively. Positive bias or direct current anode supply voltages are taken from the junction of resistor 107 and capacitor 109 and fed to loads, not shown. In actual practice, I use this source of positive potential for driver tube supply in the modulator. For best results these loads should draw approximately equal current flow through resistors 107 and 108.

*Operation*

Modulator tubes 11 and 12 are both biased approximately at cutoff, and radio frequency amplifier 47 is biased for class C operation. Audio signals are fed through coupling capacitors 13 and 14 to drive the control grids of the modulator tubes. The audio signal on the grid of modulator tube 11 can be considered to be 180° out of phase with the audio signal on the grid of modulator tube 12. However, since only one of the modulator tubes is producing output signals at any given instant, the signals on the grids of the modulator tubes need not be perfectly symmetrical. That is, it is unnecessary to use undistorted audio signals to cut off either modulator tube during the portions of the cycle when the other modulator tube is producing the useful output.

Assuming that an audio signal, which at the instant in question is just starting a positive going excursion, is impressed on the input circuit of modulator tube 11, and that the phase-inverted version of the same audio signal which is impressed on the control grid of modulator tube 12 is just starting a negative going excursion, it can be seen that the negative signal on the control grid of modulator tube 12 will drive this tube to cutoff and that the positive going signal on the grid of modulator tube 11 will allow current to flow between anode 15 and cathode 24, thereby increasing the voltage on modulator output terminal A, due to the current flowing through air core inductance 25 and the upper half of iron core inductor network 28. Since modulator tube 12 is cut off, the voltage on output terminal B is controlled by the voltage on anode 15 of modulator tube 11 by virtue of the coupling action of capacitor 42. Thus, it can be seen that a positive signal excursion on the control grid of modulator tube 11 effects a positive signal excursion on output terminal A and an equal and opposite negative signal excursion on output terminal B.

When the audio signal passes through its alternating current axis so as to drive the control grid of modulator tube 12 with a positive going signal excursion, modulator tube 11 is cut off by a negative signal excursion on its grid, and the voltage on the output terminals A and B results from current flow through modulator tube 12 alone. During this portion of the cycle the voltage on output terminal B increases in the positive going direction because of modulator tube 12 anode-cathode current flow through air core inductance 36 and the lower portion of iron core inductor network 28. The negative voltage excursion on anode 31 is coupled to output terminal A through capacitor 41, and thus the negative voltage excursion on terminal A is equal and opposite to the positive going excursion on terminal B during this part of the cycle. As the audio signal passes through its alternating current axis, a second complete cycle is started and modulator tube 12 is cut off while modulator tube 11 again controls the voltage on the modulator output terminals A and B. Thus, it can be seen that the voltages on the anode and cathode of the operating tube, i. e., the tube carrying signal at any given instant, controls both the positive and negative signal excursions on the output terminals A and B during the instant in question.

The audio output from the modulator drives the radio frequency amplifier stage comprising triode 47 which is biased for class C operation. Direct current plate potential for the modulated stage is supplied from two three-phase, half-wave rectifier circuits 75 and 89 which are symmetrical, except that the "star" connected secondaries in rectifier 75 are connected to the anode of the three rectifying diodes, while in rectifier 89 the "star" connected secondaries are connected to the cathode of the three diodes. Thus, the rectifiers are polarized in such manner as to provide a direct current anode potential source for amplifier 47 which comprises the sum of the two rectified voltages with ripple voltages adding in quadrature in the same manner as in a conventional full-wave, three-phase rectifier.

Choke circuits 76, 79, 82, 85, 90, 93, 97 and 100 are inserted in the rectifier connections to choke out audio frequency signals and higher frequencies from the rectifier circuits, per se, and to increase the impedances to ground from the signal channel through the rectifiers' capacitance to ground so as to minimize signal loss. Though not shown, other than by letter designations, a, b and c, each coil of the transformer included in rectifier circuit 75 is wound on a core in common with a similar winding of the transformer included in rectifier 89. These windings are so poled on each core as to minimize the core saturation which would result if each separate core had only one winding. The signals of audio frequency are taken from output terminals A and B. and capacitively coupled to the high level modulated stage 47 through capacitors 43 and 48. Alternating current may be supplied to the "star" connected secondaries and rectifiers 75 and 89 from a delta-connected primary 103 which, in turn, is connected to a source of three-phase alternating current in the usual manner.

Radio frequency filter chokes 44 and 49 act to isolate both the rectifier circuits and the modulator output from the radio frequency carrier signals. Thus, the modulated stage has an anode-cathode voltage which, in the absence of a signal across the modulator output terminal, is supplied by the rectifier output voltages. When a signal is impressed across modulator output terminals A and B, the anode-cathode voltage across the high level modulated stage includes this audio signal in series with the rectifier voltages. As a result, both the anode and cathode voltages of the modulated stage are varied in accordance with the audio signal output of the modulator to provide anode modulation and simultaneous equal and opposite cathode modulation.

The radio frequnecy carrier is supplied to the transformer primary 60 from a source, not shown, and is magnetically coupled to transformer secondary 61 to drive the grid of the modulated tube 47. Bias is supplied to the grid circuit of tube 47 through filament transformer 53 and transformer 56 which, in turn, supplies full wave rectifier 52. The class C operating bias potential is controlled by potentiometer 65 which is connected across the output of rectifier 52.

The actual operating bias voltage is produced by rectification of the radio frequency carrier signal in the grid 62, cathode 51 path of amplifier 47. The resulting change produced on the capacitor coupled across the variable portion of potentiometer 65 acts effectively as the operating bias source. The fixed bias voltage in series therewith which is produced by rectifier 52 is low enough so as to enter into circuit operation primarily during quiescent or no-signal periods, i. e., periods when the radio frequency carrier signal is interrupted, as a protective measure.

The ratio between the fixed bias voltage and the variable bias voltage across potentiometer 65, when adjusted properly, allows amplifier 47 to operate within essentially linear characteristics. Adjustment of the fixed bias to variable bias ratio is made possible by potentiometer 65. Thus, the grid of amplifier 47 is driven by a voltage at carrier frequency, and the anode and cathode are driven by a voltage at the audio frequency. The resultant modulated output is then taken from across the anode-cathode path of tube 47 through coupling capacitors 70 and 71 and fed to a transformer primary winding 72 which is center-tapped to ground through resistor 73 and tuned by variable capacitor 74.

Neutralizing capacitor 68, which is connected between anode 45 of the modulated amplifier 47 and the cathode side of transformer secondary 61, feeds back a bucking signal which is effectively 180° out of phase with signals coupled to the grid 62 through the inherent anode to grid capacitance of the tube.

Resistors 107 and 108 in conjunction with capacitor 109 form a means for extracting direct current bias potential from the output of the system without appreciably loading the alternating current signal path. As has been stated, during the instant when modulator output terminal A is starting a positive voltage excursion, modulator output terminal B is starting a negative voltage excursion. Likewise, when modulator terminal B is starting a positive voltage excursion, terminal A is starting a negative voltage excursion. Thus, the junction between resistors 107 and 108 remains at a relatively constant potential relative to ground with the terminal A side of resistor 107 moving away from the system ground potential in an equal and opposite signal amplitude polarity direction from the voltage at the terminal B side of resistor 108. Capacitor 109 effectively ties resistors 107 and 108 together from an alternating current viewpoint and effectively blocks direct current flow from terminal A to terminal B through this network.

If resistors 107 and 108 are selected to have sufficient resistance, or if chokes are included to provide sufficient alternating current impedance, the alternating current signal loss through this network can be held to a minimum. Terminal X on the capacitor 109 side of resistor 108 then may be used to supply a bias source for modulator tubes 11 and 12 through potentiometers 110 and 111 and resistors 112 and 113 to ground. A positive load may be taken from terminal Y at the junction of resistor 107 and capacitor 109 to supply driver stage anode currents. The direct current drop through resistor 107 should be maintained substantially equal to the direct current flow through 108. Little, if any, distortion results in the output of the modulator system arising from this load network.

Coupling capacitors 41 and 42 act not only as coupling capacitors fundamental to circuit operation, but also as filtering capacitors. As can be seen, these capacitors are effectively connected across the cathanode amplifier supply source in parallel, except for the relatively low impedances of the anode and cathode circuits of the cathanode amplifier, and thus form a bypass for any alternating current ripple present in the supply source.

While I do not desire to be limited to any specific circuit parameters, such parameters varying in accordance with individual designs, the following circuit values have been found entirely satisfactory in one successful embodiment of the invention:

| | |
|---|---|
| Tubes 11 and 12 | 9C28A (Federal). |
| Tubes 47 | 5681 (Machlett). |
| Rectifiers 75 and 89 | AR63 (English Electric). |
| Resistors 18, 27, 33, 37 | 20,000 ohms. |
| Resistors 22, 30 | 40,000 ohms. |
| Resistors 78, 81, 84, 87, 92, 95, 99, 102 | 20,000 ohms. |
| Resistors 107, 108 | 7,000 ohms. |
| Inductances 21 | 75 henries. |
| Inductances 29 | 25 henries. |
| Capacitors 41, 42, 43, 48 | 30 microfarads. |
| Capacitors 109 | 20 microfarads. |
| Power supply—B+ | 15,000 volts. |
| Power supply—rectifiers 75, 89 | 6,000 volts. |

Subject matter disclosed but not claimed herein is disclosed and claimed in my copending United States patent application Serial No. 503,193, filed April 22, 1955, entitled "A Modulation System," and assigned to the same assignee as the present application and invention.

While there has been found and described what is at present considered the preferred embodiment of the invention, it will be obvious to those skilled in the art that various changes and modifications may be made therein without departing from the invention as defined by the appended claims.

Having thus described my invention, I claim:

1. In a modulator circuit, the combination comprising a modulator output inductor center-tapped to ground and having two output terminals, an audio amplifier coupled to said output terminals for developing an audio signal across each half of the output inductor which is of substantially equal peak to peak voltage value and 180 degrees out of phase with the audio signal across the other half of the output inductor, a first capacitor coupled to one of said output terminals, a second capacitor coupled to the remaining output terminal, a series network coupled between said capacitors comprising a first resistance, an intercoupling capacitor and a second resistance having a resistance value substantially equal to the resistance value of said first resistance, a first direct current load means coupled between ground and the junction of said first resistance element and the intercoupled capacitor, and a second load means coupled between ground and the junction of said second resistor and the intercoupled capacitor.

2. In a modulator circuit, the combination comprising a modulator output impedance center-tapped to ground and having two output terminals, an audio amplifier coupled to said output terminals for developing an audio signal across each half of the output impedance of substantially equal peak to peak voltage and 180 degrees out of phase with the audio signal across the other half of the output impedance, a first capacitor coupled to one of said output terminals, a second capacitor coupled to the remaining output terminal, a series network coupled between said capacitors comprising a first impedance, an intercoupling capacitor and a second impedance having a resistance value substantially equal to the resistance value of said first impedance, a first direct current load means coupled between ground and the junction of said first impedance element and the intercoupled capacitor, and a second load means coupled between ground and the junction of said second impedance and the intercoupled capacitor.

No references cited.